United States Patent [19]

Grallert

[11] Patent Number: 4,569,058
[45] Date of Patent: Feb. 4, 1986

[54] TRANSMISSION SYSTEM

[75] Inventor: Hans-Joachim Grallert, Groebenzell, Fed. Rep. of Germany

[73] Assignee: Siemens Aktiengesellschaft, Berlin and Munich, Fed. Rep. of Germany

[21] Appl. No.: 596,659

[22] Filed: Apr. 4, 1984

[30] Foreign Application Priority Data

Apr. 21, 1983 [DE] Fed. Rep. of Germany ....... 3314384

[51] Int. Cl.$^4$ .............................................. H04N 7/13
[52] U.S. Cl. ........................................ 375/27; 375/34; 358/133; 358/135
[58] Field of Search ........................ 375/25, 27, 30, 31, 375/33, 34; 370/118; 358/13, 133, 135, 260; 332/11 D

[56] References Cited

U.S. PATENT DOCUMENTS

| | | | |
|---|---|---|---|
| 3,761,613 | 9/1973 | Limb | 375/25 |
| 4,141,034 | 2/1979 | Netravali et al. | 358/13 |
| 4,491,953 | 1/1985 | Bellisio et al. | 375/27 |
| 4,517,596 | 5/1985 | Suzuki | 358/133 |

OTHER PUBLICATIONS

"Funkschau", 1973, No. 16, pp. 591-593.
"Review of the Electrical Communication Laboratories", vol. 27, No. 11-12, Nov.-Dec., 1979, pp. 1095-1112.

Primary Examiner—Benedict V. Safourek
Attorney, Agent, or Firm—Hill, Van Santen, Steadman & Simpson

[57] ABSTRACT

A transmission system wherein PCM code words are converted into DPCM code words at the transmit side and are reconverted into PCM code words at the receive side. A DPCM coder comprising a respective quantizer for variable-length code words, a quantizer for code words having a fixed, below-average length, and a DPCM decoder comprising a code converter for variable-length code words and a code converter for code words having a fixed, below-average length are provided for this purpose. The type of conversion for the next PCM code word present at the input is selected after each conversion on the basis of the number of memory locations that still exist. This transmission system is suitable for data reduction, particularly of digital video signals.

3 Claims, 5 Drawing Figures

FIG 2
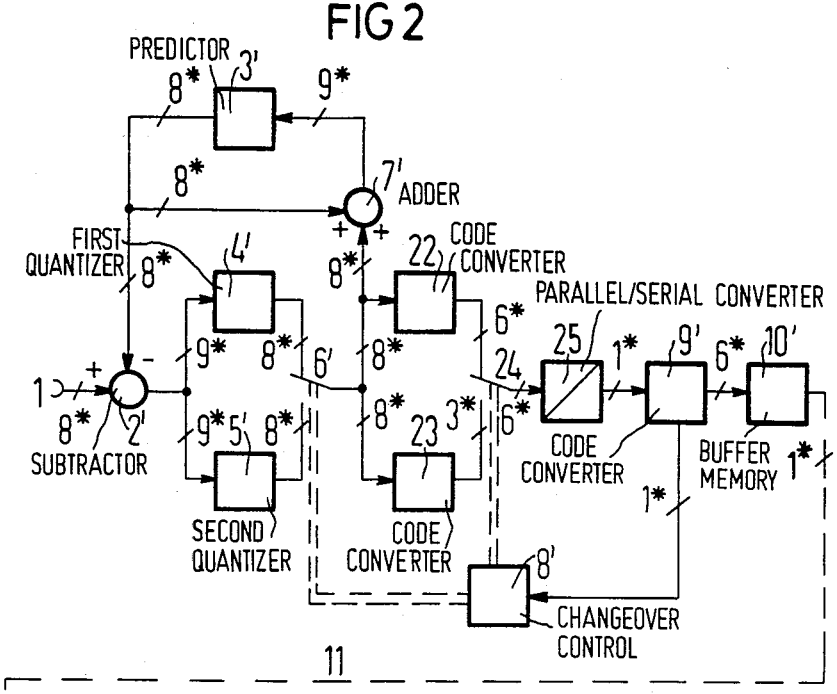
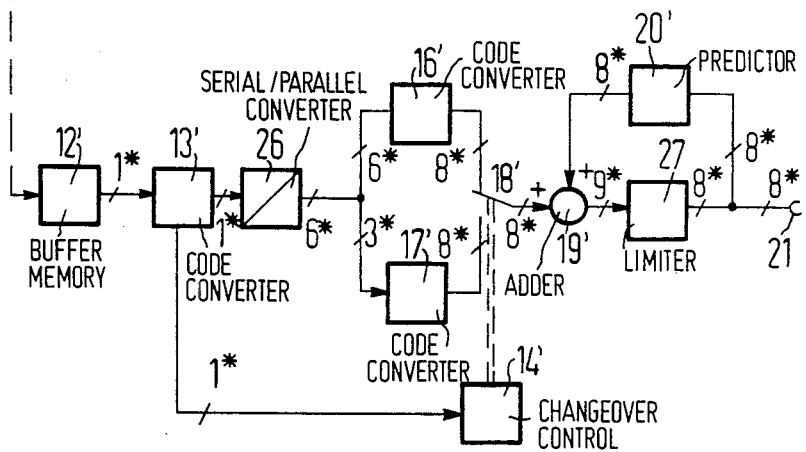

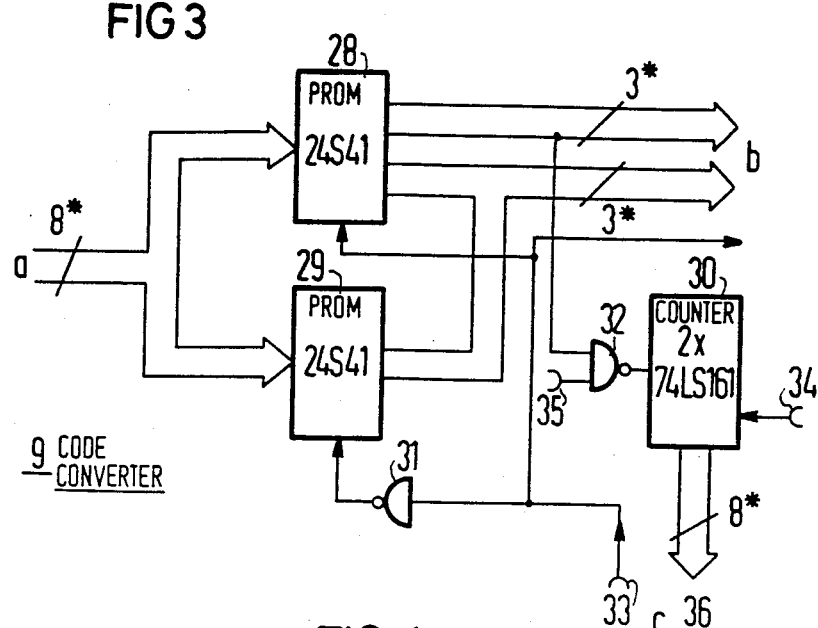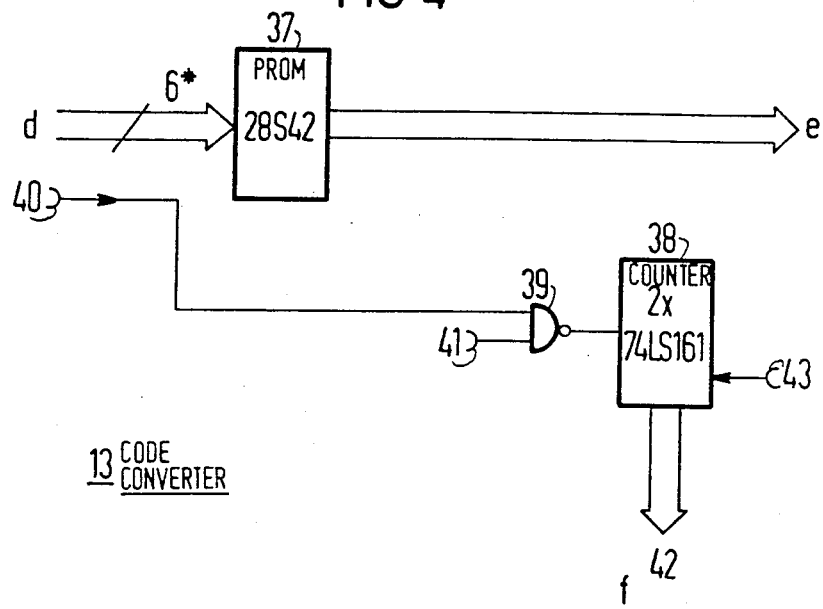

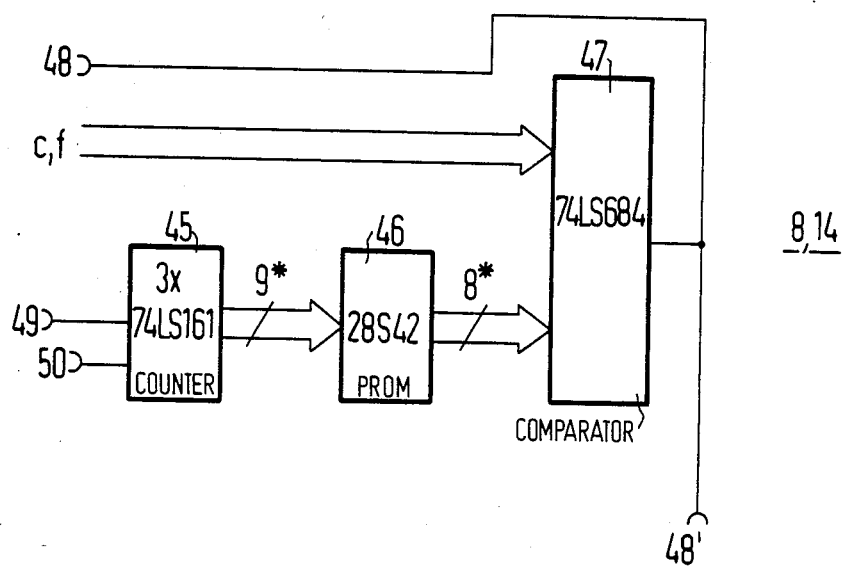

4,569,058

TRANSMISSION SYSTEM

BACKGROUND OF THE INVENTION

The invention relates to a transmission system which reduces PCM code words, particularly PCM code words of video signals that are to be transmitted. At the transmit side, a DPCM coder is provided comprising a first quantizer for the generation of variable-length DPCM code words and a second quantizer for the generation of DPCM code words having a fixed, below-average length. The quantizer is connected parallel at the input side and is alternately connectible at the output side by means of a changeover control of the transmit side via a first, transmit-side changeover switch. A transmit-side code converter is provided for the reduction of the number of bits per code word by which the transmit-side changeover switch control is actuated. A transmit-side buffer memory and a receive-side buffer memory are also provided. A first receive-side code converter for increasing the number of bits per image point which actuates a receive-side changeover control and a DPCM decoder comprising a second receive-side code converter for the conversion of the variable-length DPCM code words into unit-length DPCM code words are also provided. A third receive-side code converter for the conversion of the DPCM code words having a fixed, below-average length into unit-length DPCM code words is connected to the receive-side buffer memory. The second and third receive-side code converters are alternately engageable at the input side via a first receive-side changeover and at the output side via a second receive-side changeover by means of the receive-side changeover control. A DPCM sub-decoder follows downstream of the second receive-side changeover and converts the unit-length DPCM code words into PCM code words having the original length.

PCM is the abbreviation for pulse code modulation and DPCM is the abbreviation for differential pulse code modulation. DPCM coders and decoders are disclosed, for example, in the periodical "Funkschau", 1973, No. 16, pages 591–593, particularly FIG. 6c, incorporated herein by reference.

A transmission system of the type initially described is known from the reference "Review of the Electrical Communication Laboratories", Vol. 27, No. 11–12, November-December, 1979, pages 1095–1112, incorporated by reference.

Given this transmission system for video signals, the first quantizer, depending upon the respective coding rule, serves for generating four-place or eight-place DPCM code words. The transmit-side changeover control counts the eight-place DPCM code words appearing in a measuring time span and engages the other quantizer after a certain plurality has been reached, the other quantizer generating four-place DPCM code words. Given this system, a changeover to the quantizer having the coarser characteristic is undertaken given an impending buffer overflow. Beginning with the changeover point, gross quantization errors occur in the remaining picture lines, and this can extend to picture areas.

SUMMARY OF THE INVENTION

An object of the invention is to specify a transmission system wherein the image defects based on the quantization errors are less noticeable.

Proceeding from a transmission system of the type initially described, this object is achieved by equipping the transmit-side buffer memory with memory locations for a prescribed plurality of average-length DPCM code words. The transmit-side changeover control is designed such that it checks, after the formation of each DPCM code word, whether a sufficient number of memory locations are still present for the prescribed plurality of DPCM code words, and connects the first quantizer given a positive result and connects the second quantizer given a negative result. The receive-side changeover control is designed such that it connects either the first code converter or the second code converter after a corresponding check.

In the transmission of digital video signals, the number of memory locations respectively relates to one or more picture lines.

Given the system according to the invention, a changeover to the quantizer having the coarser characteristic is undertaken in the environment of signal discontinuities (picture edges) because code words of above-average length only appear there. The eye does not pick up gross quantization errors in the environment of edges. When sufficient storage space is again available in the further path of the line, the resolution is again increased by means of the quantizer for variable word length. Quantization errors thus predominantly occur in the environment of edges and not fundamenta-ly in the right-hand side of the picture.

It is advantageous when a DPCM coder and a DPCM decoder are provided for the conversion of code words present in parallel. The DPCM coder is followed downstream by a parallel-to-serial converter, and the DPCM decoder is preceded upstream by a serial-to-parallel converter.

It is also advantageous when two transmit-side code converters that are connected in parallel at the input side are provided between the DPCM coder and the parallel-to-serial converter for the reduction of the number of parallel lines, and when the outputs of the transmit-side code converters are connected to the input of the parallel-to-serial converter via a second transmit-side changeover that is controlled by the transmit-side converter control.

BRIEF DESCRIPTION OF THE DRAWINGS

FIG. 2 shows a modification of the transmission system according to the invention for processing code words present in parallel;

FIG. 3 shows a transmit-side code converter in detail;

FIG. 4 shows a first receive-side code converter in detail; and

FIG. 5 shows a transmit-side and receive-side changeover control in detail.

DESCRIPTION OF THE PREFERRED EMBODIMENTS

Figure 1:
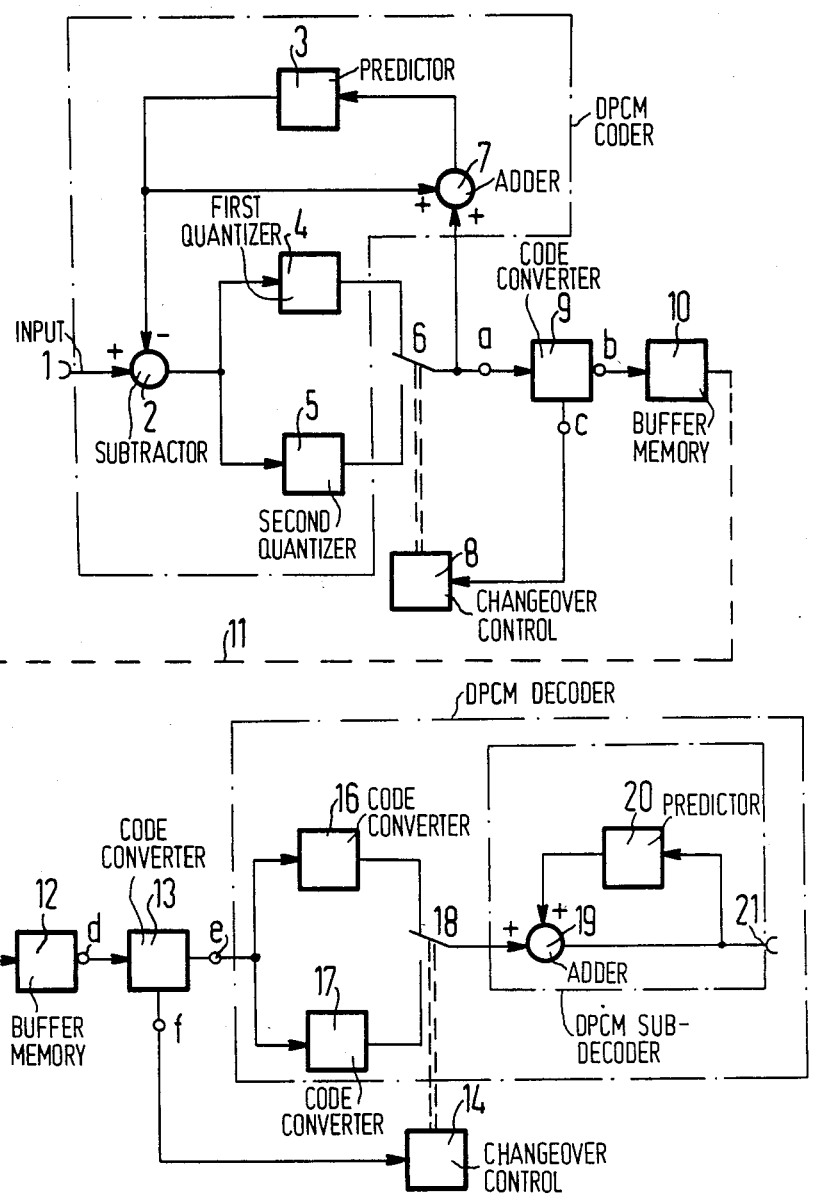
FIG. 1 shows a transmission system according to the invention.

FIG. 1 shows the transmission system according to the invention whose transmit side contains the elements 1–10 and whose receive side contains the elements 12–21. The transmission circuit is referenced 11.

The transmit portion contains an input 1, a subtractor 2, a predictor 3, a first quantizer 4 for generating variable-length DPCM code words, a second quantizer 5 for generating DPCM code words having a fixed, below-average length, a changeover 6, an adder 7, a changeover control 8, a transmit-side code converter 9, and a buffer memory 10.

The receive side contains a buffer memory 12, a code converter 13, a changeover control 14, a changeover 18, a code converter 16 for variable-length DPCM code words, a code converter 17 for DPCM code words having a fixed, below-average length, an adder 19, a predictor 20, and an output 21.

A digital video signal is applied to the input 1. The conversion of the first PCM code word of a picture line is thus begun. The DPCM coder comprising the elements 2, 3, 4 and 7 converts this PCM code word into a DPCM code word whose length is based on the requirements of the DPCM loop and whose content is dependent on the coding rule. The number of bits per picture point is then reduced to the actually required value in the code converter 9. A check is also undertaken to determine whether a sufficient number of memory locations for the remaining DPCM code words of the picture line are still present after the read-in of this DPCM code word. When this is the case, the position of the changeover 6 is not changed and the next DPCM code word is converted in the same DPCM coder. Should it occur that the prescribed minimum plurality of memory locations for the DPCM code words still to be anticipated in the picture line is reached, the changeover control 8 receives a signal and in turn switches the changeover 6. The next PCM code word present at the input 1 is now supplied to the DPCM coder comprising the elements 2, 3, 5 and 7 which converts it in a short DPCM code word of constant length. When, after one or more conversions, the code converter 9 determines that a sufficient reserve of memory locations is available for the DPCM code words of the picture line still to be anticipated, then it initiates a renewed change-over of the changeover 6 via the changeover control 8. Memory locations that are not occupied at the end of the picture line are filled with arbitrary data, for example zeroes.

The DPCM code words received by the buffer memory 12 after transmission via the line 11 are supplied to the code converter 13 and are interpreted in the same manner as occurs at the transmit side. This means that, as delayed by the transmission time of the link 11, the changeover control 14 controls the changeover 18 in the same rhythm as the changeover 6. The DPCM decoder comprises converter 16 or 17 and a DPCM sub-decoder. The code converter 16 converts the variable-length DPCM code words and the code converter 17 converts the DPCM code words having a fixed, below-average length into unit-length DPCM code words. The DPCM sub-decoder comprising the adder 19 and the predictor 20 finally converts the unit-length DPCM code words into PCM code words that can be accepted at the output 21. Although these PCM code words have the same length as the original PCM code words at the input 1, the errors that occurred in the quantization can no longer be reversed.

FIG. 2 shows a modification of the transmission system according to the invention wherein the PCM code words are offered in parallel at the input side and are in turn taken parallel at the output side.

The transmission system contains the elements already shown in FIG. 1. Their reference numerals are provided with a prime. In addition, the transmission system contains code converters 22 and 23, a changeover 24, a parallel-to-serial converter 25, a serial-to-parallel converter 26, and a limiter 27. The numerals provided with an asterisk indicate the number of parallel lines.

The functioning of this transmission system essentially corresponds to that according to FIG. 1. At least eight parallel lines must be respectively provided in the DPCM coders so that the individual elements can cooperate even when not all of these connecting lines are occupied with signals.

A reduction of this plurality does not occur until carried out by the code converters 22 and 23. The remaining, six-place maximum DPCM code words are converted in the parallel-to-serial converter 25 and are supplied via the buffer memory 10', the line 11', and the buffer memory 13' to the serial-to-parallel converter 26' which is followed by the DPCM decoder 14', 16', 17', 18', 19', 20' and 27' in which the reconversion occurs.

FIG. 3 shows the code converter 9 with its input a, with its output b, and its control output c according to FIG. 1 in detail. The arrangement contains programmable read-only memories (PROM) 28 and 29 of the type 24S41, a counter 30 consisting of two integrated circuits of the type 74LS161, an inverter 31, and a NAND gate 32.

The code words coming from the DPCM loops 1 through 7 in FIG. 1 are present at the input a, said code words intended to be 8-bit code words in this case. When they result from the quantizer 4, these are converted into a 3-bit or 6-bit code word in the programmable read-only memory 28 and are converted into a 3-bit code word in the programmable read-only memory 29 when they result from the quantizer 5. The decision as to which programmable read-only memory is to be utilized for the conversion is made by a signal adjacent to the input 33, said signal proceeding into the code converter 9 parallel to the output c.

The output b consists of six data lines and of one signalling line in communication with the input 33 which informs the buffer memory 10 whether the code word present on the data lines was converted in the programmable read-only memory 28 or in the programmable read-only memory 29.

The counter 30 is reset at the beginning of a picture line by means of a line pulse adjacent to the input 34. The counter 30 counts the number of 6-bit code words with the word clock adjacent to the input 35 and with the NAND gate 32. The counter output 36 always indicates the number of 6-bit code words already coded in the current line.

FIG. 4 shows the code converter according to FIG. 1 in detail, comprising the input d, the output e, and the control output f. The arrangement contains a programmable read-only memory (PROM) 37 of the type 28S42, a counter 38 consisting of two integrated circuits of the type 74LS161, and a NAND gate 39.

The 3-bit or 6-bit code words coming from the buffer memory 12 are present at the input d. In addition, a signal is present at the input 40, this signal indicating whether a 3-bit or a 6-bit code word is adjacent on the six parallel lines of the input d. The programmable read-only memory 37 decodes the 6-bit code word into the number of the corresponding quantization stage which is then output into the following circuit at the output e.

The signal at the input 40 opens the NAND gate 39 so that the counter 38 counts up with the picture point clock at the input 41. The number of 6-bit code words already received in the current picture line is present at the output 42. The counter 38 is reset at the beginning of every line with a line pulse at the input 43. The counter reading of the counter 38 is processed in an arrangement according to FIG. 5.

FIG. 5 shows a changeover control 8 or 14 comprising an input c or f. The arrangement contains a counter 45 which is realized with three integrated circuits 74LS161, a programmable read-only memory (PROM) 46 of the type 28S42, and a comparator 47 in the form of an integrated circuit of the type 74LS684.

The counter 45 counts the number of code words already coded in a picture line. It is reset at the beginning of every picture line by means of a line pulse adjacent to the input 50 and counts with the assistance of the word clock adjacent to the input 49. The output of the counter is connected to the input of the programmable read-only memory 46 whose output indicates how many 6-bit code words are allowed up to the current picture point in the picture line. The comparator 47 compares the number of allowed 6-bit code words to the number of code words that have actually appeared at the input c or f. When their plurality os greater than that at the output of the programmable read-only memory 46, then the comparator emits a signal to the outputs 48 and 48'. This signal causes the changeover 6 in FIG. 1 to change over to the quantizer 5. At the same time, it informs the code converter 9 in FIG. 1 that the next code word is to be coded with three bits. When the arrangement forms the changeover control 14 according to FIG. 1, then the signal at the outputs 48, 48' effects the changeover of the changeover 18.

The construction of the quantizers 4 and 5 and the construction of the predictors 3 and 20 are well known and, for example, can be constructed in accordance with the DPCM loop with predictor and quantizer of the GEC McMichael Company.

Although various minor changes and modifications might be suggested by those skilled in the art, it will be understood that I wish to include within the claims of the patent warranted hereon all such changes and modifications as reasonably come within my contribution to the art.

I claim as my invention:

1. A transmission system which reduces PCM code words that are to be transmitted, comprising:
(a) at the transmit side
 (1) a DPCM coder comprising
  (i) a first quantizer means for generation of variable-length DPCM code words,
  (ii) a second quantizer means for generation of DPCM code words having a fixed, below-average length,
 (2) said second quantizer means being connected parallel at its input side with the first quantizer means, and the first or second quantizer means being alternately connectable at their output sides by a changeover control means to a code converter means via a first changeover switch means;
 (3) said code converter means being connected to the changeover control means for reduction of a number of bits per code word by which the changeover control means is actuated;
 (4) a buffer memory connected to the code converter means and also connected to a transmission line;
(b) at the receive side
 (1) a buffer memory connected to the transmission line;
 (2) a first code converter means connected to the buffer memory for increasing a number of bits per picture point, and which is connected to actuate a changeover control means;
 (3) a DPCM decoder comprising
  (i) a second code converter means connected to said buffer memory for conversion of the variable-length DPCM code words into unit-length DPCM code words,
  (ii) a third code converter means for conversion of the DPCM code words having a fixed, below-average length into unit-length DPCM code words connected to said buffer memory,
  (iii) a DPCM sub-decoder,
 (4) said second and third code converters being alternately connected at their output sides to said DPCM sub-decoder means via a changeover control means;
(c) the DPCM sub-decoder means connected to the receive-side changeover for converting the unit-length DPCM code word into PCM code words having the original length;
(d) the transmit-side buffer memory means being equipped with memory locations for a prescribed number of DPCM code words having an average length;
(e) the transmit-side changeover control means being designed such that it checks after the formation of each DPCM code word as to whether a sufficient number of memory locations is still present for the prescribed plurality of DPCM code words and connects the first quantizer means given a positive result and connects the second quantizer means given a negative result; and
(f) the receive-side changeover control means being designed such that it connects either the first code converter means or the second code converter means to the DPCM sub-decoder after a corresponding check.

2. A transmission system according to claim 1 wherein a DPCM coder means and a DPCM decoder means are provided for conversion of code words present in parallel; said DPCM coder means being followed downstream by a parallel-to-serial converter; and said DPCM decoder means being preceded upstream by a serial-to-parallel converter.

3. A transmission system according to claim 2 wherein two transmit-side code converters are connected in parallel at the input side and are provided between the DPCM coder means and the parallel-to-serial converter for reduction of a number of parallel lines; and the outputs of said transmit-side code converters being connected to the input of the parallel-to-serial converter via a second transmit-side changeover that is controlled by the transmit-side changeover control.

* * * * *